United States Patent [19]

Shiho et al.

[11] Patent Number: 4,740,884
[45] Date of Patent: Apr. 26, 1988

[54] BANK-LINKED PROGRAMMABLE CONTROLLER

[75] Inventors: Toshio Shiho, Takatsuki; Kenji Matsui, Nagaokakyo; Toshiaki Nagao, Muko; Akira Nagano, Nagaokakyo, all of Japan

[73] Assignee: Omron Tateisi Electronics Co., Kyoto, Japan

[21] Appl. No.: 873,305

[22] Filed: Jun. 9, 1986

Related U.S. Application Data

[63] Continuation of Ser. No. 556,996, Dec. 1, 1983, abandoned.

[30] Foreign Application Priority Data

Dec. 1, 1982 [JP] Japan ................. 57-211555

[51] Int. Cl.$^4$ .......................... G06F 3/00; G06F 9/00
[52] U.S. Cl. ..................... 364/143; 364/147; 364/191
[58] Field of Search ............. 364/200, 300, 900, 191, 364/192, 193, 194, 143, 146, 147, 477, 162, 157, 148, 155, 150

[56] References Cited

U.S. PATENT DOCUMENTS

| | | | |
|---|---|---|---|
| 4,204,253 | 5/1980 | van de Hanenberg et al. | 364/200 |
| 4,206,552 | 6/1980 | Pomerantz et al. | 364/477 X |
| 4,232,364 | 11/1980 | Bibbero | 364/194 X |
| 4,314,330 | 2/1982 | Slawson | 364/192 |
| 4,315,315 | 2/1982 | Kossiakoff | 364/191 X |
| 4,328,550 | 5/1982 | Weber | 364/474 |
| 4,407,013 | 9/1983 | Arcara et al. | 364/149 |
| 4,451,878 | 5/1984 | Shigemasa | 364/162 |
| 4,455,619 | 6/1984 | Masui et al. | 364/147 X |
| 4,481,567 | 11/1984 | Kaya et al. | 364/162 X |
| 4,491,932 | 1/1985 | Ruhman et al. | 364/194 X |

Primary Examiner—Jerry Smith
Assistant Examiner—Allen MacDonald
Attorney, Agent, or Firm—Stevens, Davis, Miller & Mosher

[57] ABSTRACT

A programmable temperature controller comprises a storage member having a plurality of bank storage areas each for storing bank data having a series of control steps and a link storage area for storing link data designating a combination of the bank storage areas. An input member is provided for entering the bank data and the link data into the storage member. A sensing member senses measured data from an object to be controlled by the controller. An output member powers the object, and a control member controls the output member based on the sensed measured data generated from the sensing member so that the object may be controlled in accordance with the bank data and the link data.

1 Claim, 6 Drawing Sheets

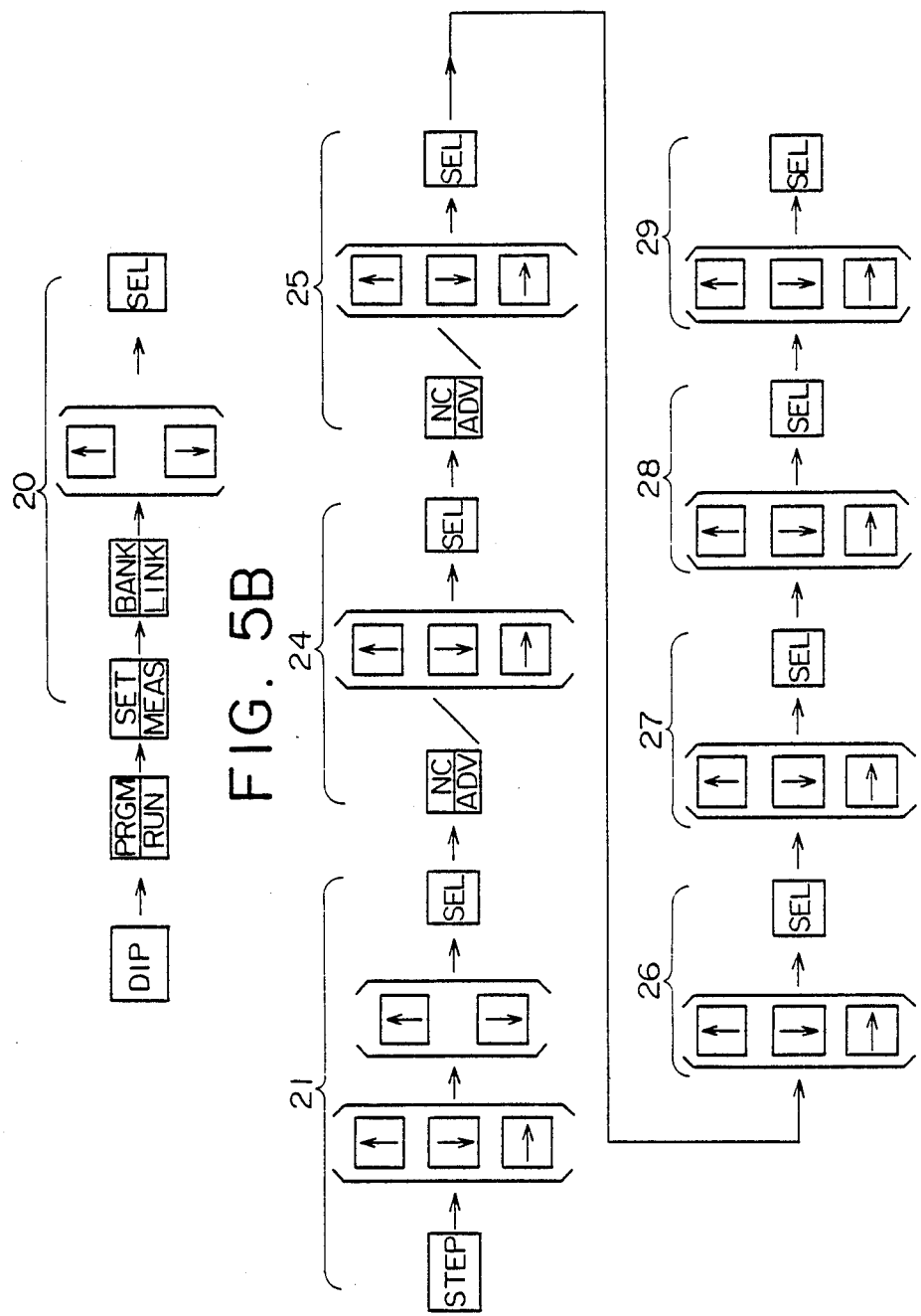

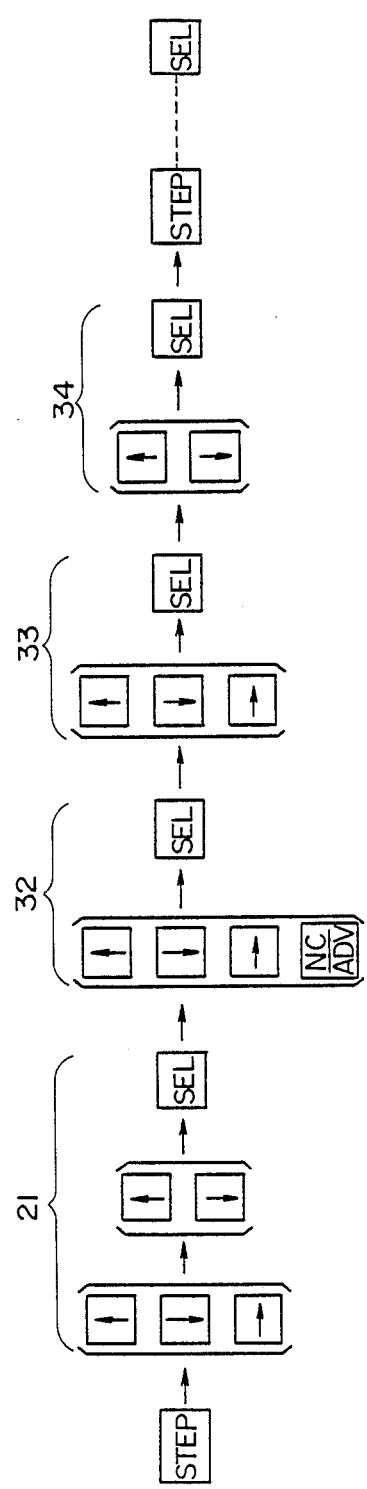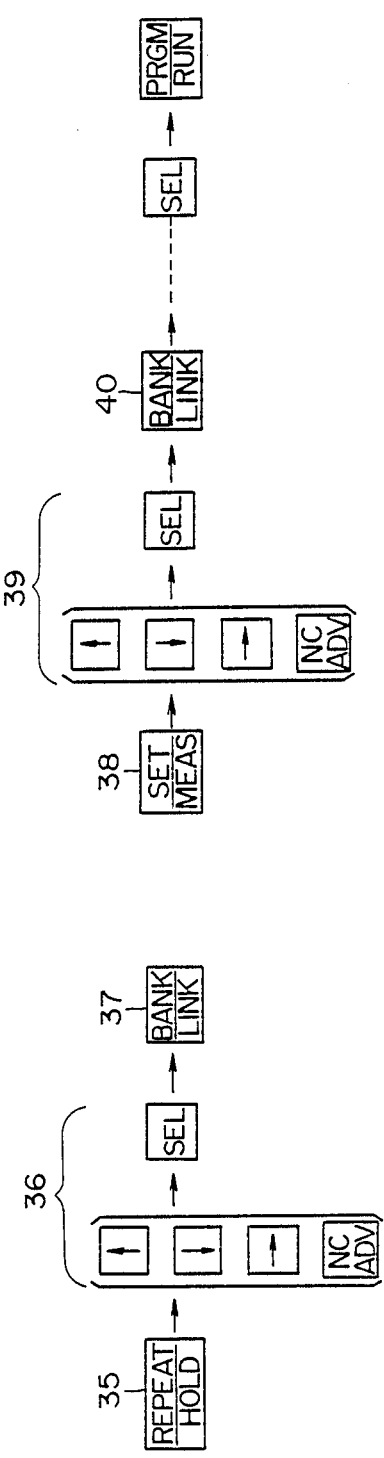

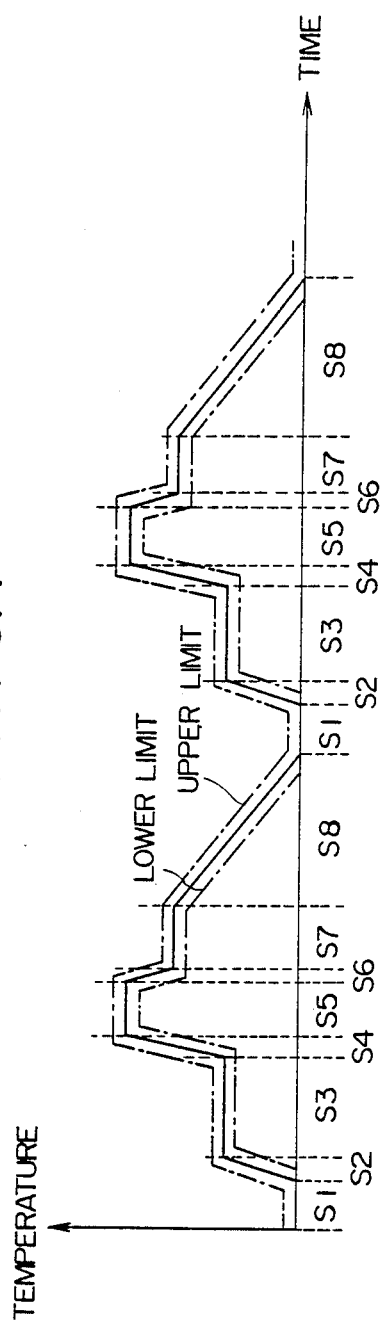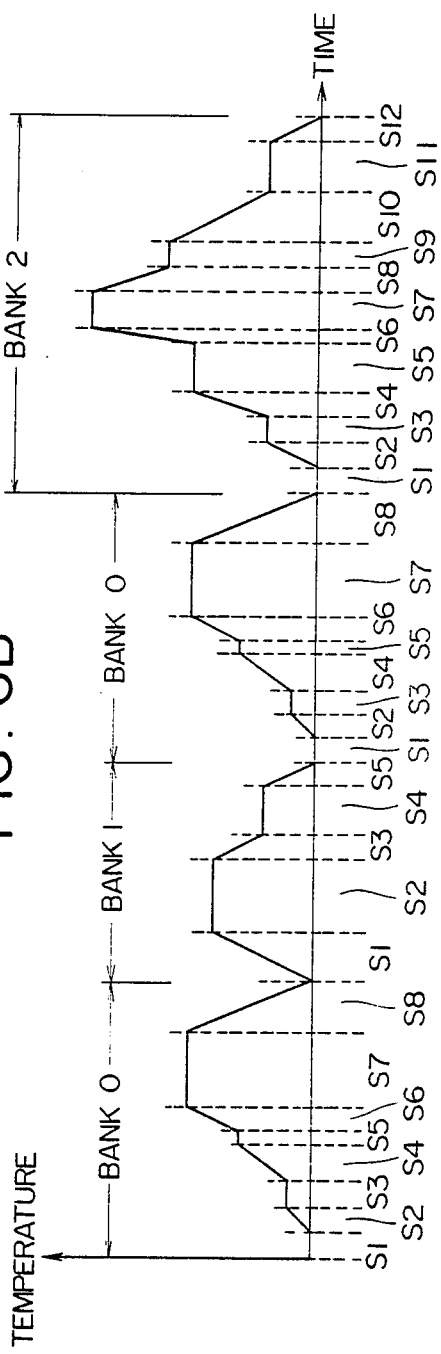

BANK-LINKED PROGRAMMABLE CONTROLLER

This application is a continuation of application Ser. No. 556,996, filed Dec. 1, 1983, now abandoned.

FIELD OF THE INVENTION

This invention relates to a programable controller, and more particularly to an improved programable controller for controlling an object on a time basis in accordance with a predetermined program.

BACKGROUND OF THE INVENTION

A recently developed microcomputer provides a controller with a programming function. For example, a programable temperature controller provided with a microcomputer has, in addition to a conventional temperature controlling function, a programable function such that the temperature of an object to be controlled can be controlled on a time basis in accordance with a previously programmed temperature control pattern. Since the programable controller, however, can store only one kind of control cycle, a plurality of different control cycles cannot be set in the controller, so that whenever a different control cycle is to be executed after execution of a previous control cycle a new series of control steps must be newly set in the controller which is a troublesome operation.

It is, therefore, a primary object of this invention to provide a programable controller adapted to store a plurality of control patterns combinable with one another to form a complicated control pattern.

It is another object of this invention to provide a programable controller in which it is easy to preset desired control programs with simple operations.

In accordance with this invention, there is provided a programable controller comprising storage means including a plurality of bank storage areas each for storing bank data having a series of control steps which are executed and a link storage area for storing link data designating a combination of the bank storage areas for actual execution. The programable controller of the present invention also includes input means for entering the bank data and the link data into the storage means, and sensing means for sensing measured data from an object to be controlled. It also includes output means for powering the object, and control means for controlling the output means based on the sensed measured data generated from the sensing means so that the object may be controlled in accordance with the bank data and the link data. Thus, the programable controller of this invention may store a plurality of control patterns associated with the link data, so that it is not necesssary to set control data prior to each execution of different control patterns. Moreover, since any desired combination among the stored control patterns are available for control, a higher level or complicated control pattern can be constructed. Thus, the controller may be easily and flexibly used.

Other objects as well as the numerous advantages of the programable controller according to this invention will become apparent from the following detailed description and the accompanying drawings, in which:

BRIEF DESCRIPTION OF DRAWINGS

FIGS. 5A through 5E show a series of manual operations for setting the controller of FIG. 1; and FIGS. 6A and 6B illustrate different control patterns, respectively.

DETAILED DESCRIPTION

Figure 1:
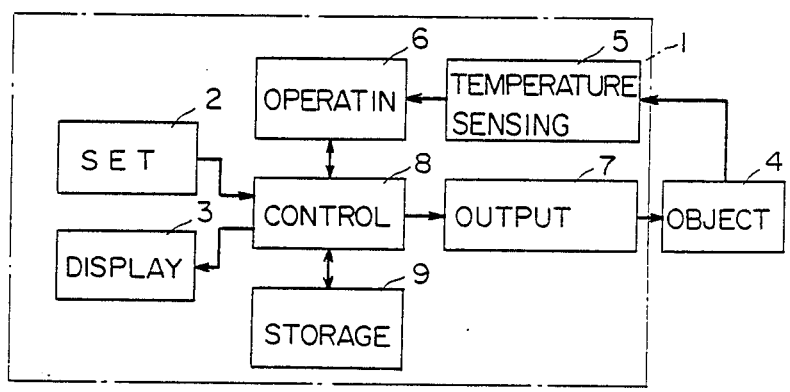
FIG. 1 is a schematic block diagram showing a programable controller as a preferred embodiment of this invention.

Returning, now, to FIG. 1, there is shown a programable temperature controller 1 as a preferred embodiment of this invention though this invention is not limited to such a temperature controller but is applicable to other programable controllers. For the purpose of explanation, such a temperature controller is employed in this embodiment.

The programable temperature controller 1 includes a setting member 2 for setting control steps and control parameters such as P.I.D. (proportional, integral and differential) constants or the like, a display member 3 for displaying parameters or information on setting, a temperature sensing member 5 associated with an object 4 to be controlled to sense temperature of the object 4, an operation member 6 for producing a difference between a set temperature and a detection temperature, an output 7 including, for example, a heater and, a motor, a control member 8, and a storage 9. The control member 8 includes a central processing device and a read-only-memory so that in accordance with predetermined processes the temperature of the object 4 may be controlled through the output 7 based on an input obtained from the sensing member 5.

Figure 2:
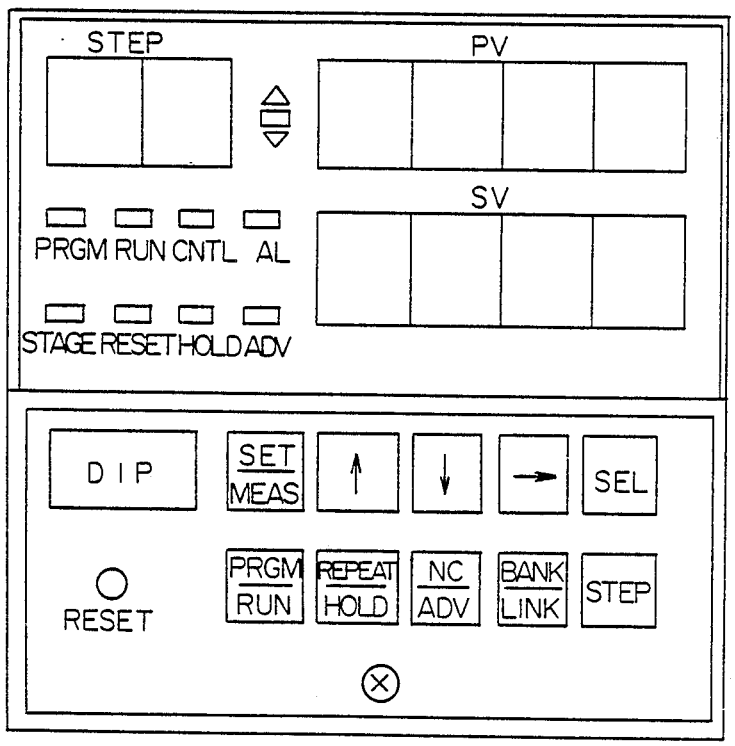
FIG. 2 illustrates a front panel provided with a setting member and a display member which are employed in the controller of FIG. 1.

In FIG. 2 there is shown a front panel of the programable temperature controller 1. The setting member 2 and the display member 3 are mounted on lower and upper sections of the front panel, respectively. On the panel there are mounted a DIP (dual-in-line-package) switch labelled as "DIP" for setting various modes of program protection or non-protection and so on, and a program-run switch labelled as "PRGM/RUN" for selecting a program mode to write or a run mode to execute a control program. Also mounted thereon is a step switch labelled as "STEP" for selecting a parameter and further, on the program mode, for allowing program writing. The panel also has mounted thereon numerical value control switches labelled " ↑ ", " ↓ " and "→" for respectively increasing, decreasing and shifting-down a parameter value, and a repeat-hold switch labelled as "REPEAT/HOLD" for, on the program mode, designating a number of times of repeating and for on the run mode, holding a program execution. Also mounted thereon is a non-control-advance switch labelled to "NC/ADV" for, on the program mode, designating non-control or continuous repeat and for, on the run mode, advancing an execution forwards. The panel also includes a bank-link switch labelled as "BANK/LINK" for, on the program mode, designating a bank and for, on the run mode designating a link, and a set-measure switch labelled as "SET/MEAS" for selecting a display of a set value or a measured value. The panel also has a reset switch labelled as "RESET" for clearing parameters.

Figure 3:
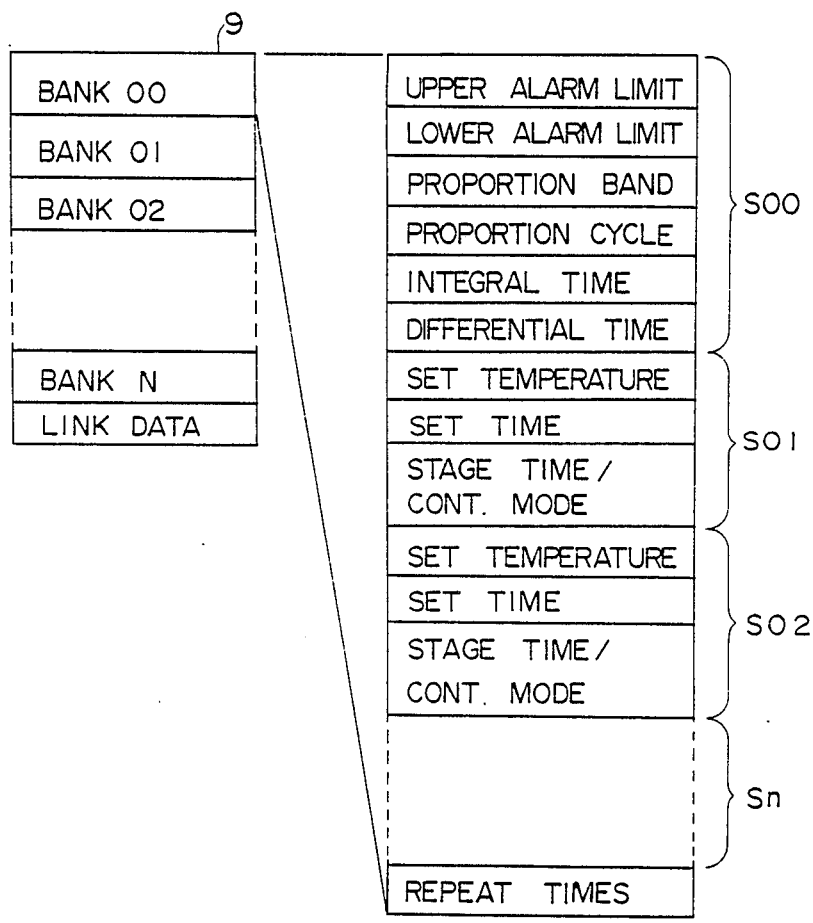
FIG. 3 illustrates a storage map of a storage employed in the controller of FIG. 1.

The storage 9 consists of a random-access-memory (RAM) having storage areas for storing various control data which are entered through the setting member 2, a memory map of which is illustrated in FIG. 3. The storage 9, as illustrated in FIG. 3, consists of a bank area having a plurality of banks 00 to N for storing control data and a link area for storing control link data. Each bank includes a series of control patterns consisting of a plurality of steps, and a controller according to this embodiment performs a temperature control for each bank unit. The link data represents combinations of the banks which are to be executed by the controller. Each bank includes a storage area in a step S00 for storing control information commonly used in the bank, viz. an upper alarm limit value, a lower alarm limit value, proportion band, proportion cycle, integral time and differential time. Each bank further includes a plurality areas in steps S01 through Sn each for storing set temperature, set time. Each bank further includes stage time or continuous mode, and a storage area for storing a number of repeating times. The stage time defines a time period of a pulse signal generated at a turning point of each step. The continuous mode is a mode on which, at a turning point of each step, a predetermined output signal is automatically generated.

Figure 4:
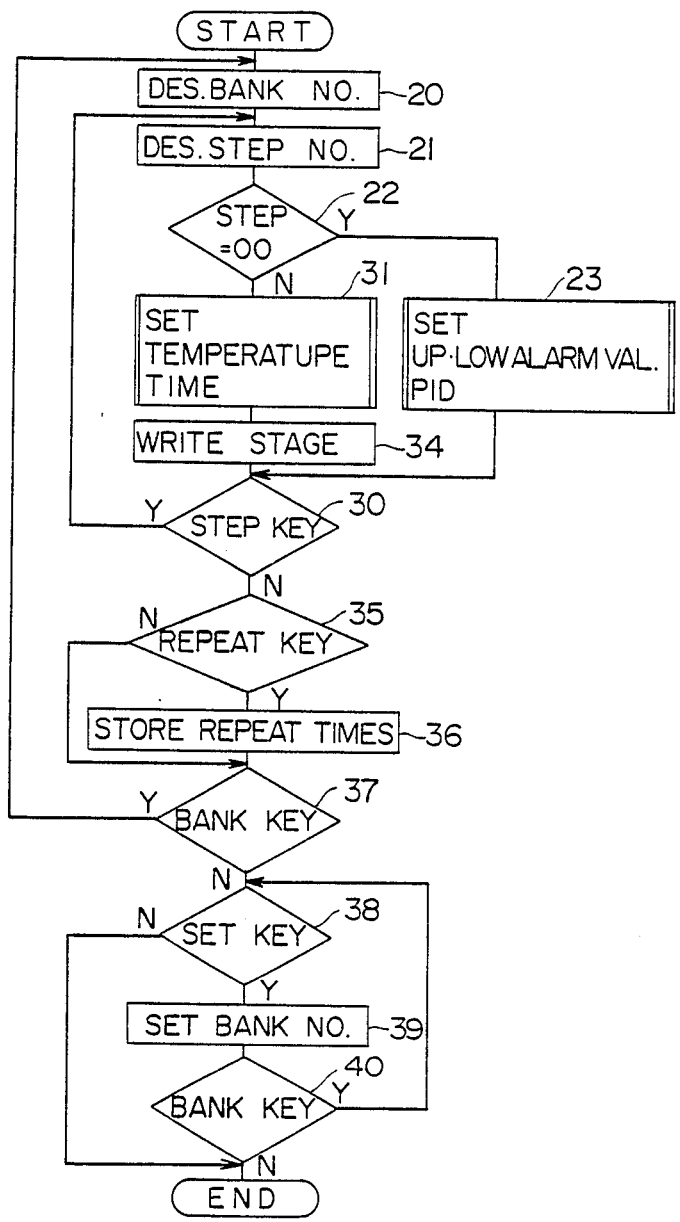
FIG. 4 is a flow chart illustrating a series of setting operations in the controller of FIG. 1.

FIG. 4 is a flow chart illustrating the operations for setting each control data in the temperature controller 1 and processed in the control member 8. FIGS. 5A through 5E illustrate manual operations by the switches of FIG. 2 for the flow chart. As illustrated in FIG. 5A, the DIP switch is actuated for setting non-protection mode, and the switch PRGM/RUN is set to program mode. In a step 20, a bank number is designated in such a manner that the switch SET/MEAS is set to a set value mode, the switch BANK/LINK is set to a bank designation, the switches " ↑ " and " ↓ " are pushed for designating a desired bank number, and the bank number is registered by the actuation of switch SEL. In step 21 a step number is designated. As illustrated in FIG. 5B, the switch STEP, the numerical control switches " ↑ ", " ↓ " and "→" and the switch SEL are actuated, so that a step number is entered. Each bank must be recorded with control information belonging to the bank in its initial stage. For this purpose, if a step number "00" is entered, a sequence from the step 21 flows through an inquiry step 22 to a step 23 where control parameters for the bank are entered. As illustrated in FIG. 5B, when an upper and lower limitation alarm is necessary, the numerical control switches " ↑ ", " ↓ " and "→" are actuated to set desired limit values, or when upper and lower limitation alarms are not necessary, the switch NC/ADV is actuated and thereafter the switch SEL is actuated so as to store data of alarm or no-alarm in the memory 9 (steps 24 and 25 in FIG. 5B). Then, PID information data, viz. proportion band, proportion cycle, integral time, and differential time are respectively designated to their desired values by actuating the switches " ↑ ", " ↓ " and "→", and their respective designated values are stored by actuating the switch "SEL" as illustrated in steps 26, 27, 28 and 29 of FIG. 5B. Thus, these parameters are registered, and upon depression of the switch STEP, a sequence from the step 23 of FIG. 4 flows to a step 21 through an inquiry step 30, so that the designation of step number may be repeated. If a side number S01 is entered, the sequence from the step 21 flows through the step 22 to a step 31 in which temperature, time and so forth are set. That is, as illustrated in a step 32 of FIG. 5C, a desired set temperature is designated by the numerical control switches " ↑ 38 , " ↓ " and "→", or non-control is designated by the switch NC/ADV, and the temperature is registered by actuating the switch SEL. Then, in a step 33 a control time is designated and registered by the numerical control switches and the SEL switch. In a subsequent step 34 a stage time is registered, so that the step S01 registration is completed. When the registrations of subsequent steps S02 . . . Sn are necessary, the operations from step 21 to step 34 are repeated. Thus, in the storage 9, control data in the respective steps S00 through Sn are registered, and then it is selectably determined whether or not a control pattern in the bank is repeated. If the repeat of the control pattern is necessary, the switch REPEAT/HOLD is actuated (step 35 of FIG. 4 and FIG. 5D), and a number of repeat times is selected and registered by the numerical control switches and the SEL switch (step 36 of FIG. 4 and FIG. 5D). If the repeat of the control pattern is unnecessary or registration of the number of repeat times is finished and further control data are to be registered in another bank, the switch BANK/LINK is actuated so as to advance a sequence from a step 37 (FIG. 4 and FIG. 5D) to the step 20 for repeating a similar registration. Thus, the registration of data in bank storage areas is completed, and then an order of operations in the bank is registered in the storage 9 as link data. FIG. 5E illustrates manual operations for the registration. The switch SET/MEAS is actuated so as to advance a sequence from the step 37 to a step 39 through step 38, whereby a bank number of the bank to be initially operated is set and registered by the numerical control switches. If any other bank is subsequently to be registered, the switch BANK/LINK is actuated so as to return the sequence from step 40 to the step 38, whereby the sequence from step 38 to step 40 is repeated so as to register link data in the storage 9. Thus, whole registration in the storage 9 is completed.

FIG. 6A illustrates a temperature control pattern registered in a bank, e.g. bank 00, which consists of steps S0 to S8 and in which the number of repeat times is set to two. Upon actuation of the switch PROG/RUN to the run mode, measuring operations are executed based on the pattern illustrated in FIG. 6A. The temperature of the object member 4 of FIG. 1 is controlled by the pattern as shown by a solid line curve of FIG. 6A and regulated by upper and lower limit temperature curves. Since the repeat times are set to two, the same pattern is repeated twice. If link data is registered to repeat the same bank, further repeating of the pattern of FIG. 6A may be performed.

FIG. 6B illustrates another temperature control pattern registered in the storage 9 where the banks 00, 01 and 02 are linked in the order of BANK 0-1-0-2 by link data stored in the link data storage area. The bank 00, 01 and 02 respectively include eight, five and twelve steps in addition to the respective first steps (S00). Thus, the link data stored in the storage 9 can easily provide freely combined bank patterns. If the controller 1 is designed to link k banks among the N banks, $N^k$ control patterns may be performed.

In this embodiment, temperature control patterns or programs may be designated by link operation prior to the execution of the run mode by the switch PROG/RUN. For this purpose, firstly, the switch SET/MEAS is set to the measuring mode, and the switch BANK-/LINK is set to the link mode so as to together with numerical control switches, designate the operation order of banks to be executed. Though the numerical control switches of this embodiment include three types " ↑ ", " ↓ " and "→", an additional switch "←" may be employed to shift up a parameter value or the like. Alternatively the number of repeat times stored in the storage 9 may be stored in the control member 8, and further, the link data stored in the storage 9 also may be stored in the control member 8, if desired.

Thus, the programable controller according to this invention is adapted to store a plurality of control patterns and link data, so that the control patterns may be linked according to the stored link data to form a larger number of control patterns than that of the stored patterns.

It should be understood that the above description is merely illustrative of this invention and that many changes and modifications may be made by those skilled in the art without departing fron the scope of the invention which is defined in the appended claims.

What is claimed is:

1. A programmable temperature controller for executing a control program comprising:
   sensing means for sensing a temperature of an object to be controlled;
   output means for controlling the temperature of said object;
   storage means including: (a) a plurality of bank storage areas, each for storing bank data defining a series of control steps, the control steps of each of said bank storage areas containing operator preset constants for a P.I.D. control of temperature, and set time data and set temperature data, said constants remaining constant for at least one execution of said control program and (b) a link storage area for storing link data designating a combination of said bank storage areas;
   input means for entering said bank data and said link data into said storage means; and
   control means for controlling said output means responsive to said temperature sensed by said sensing means and in accordance with said link data and the bank data contained in said designated combination of bank storage areas.

* * * * *